May 10, 1938.   A. E. STALEY, JR   2,116,610
STARCH MAKING PROCESS
Filed Nov. 17, 1934
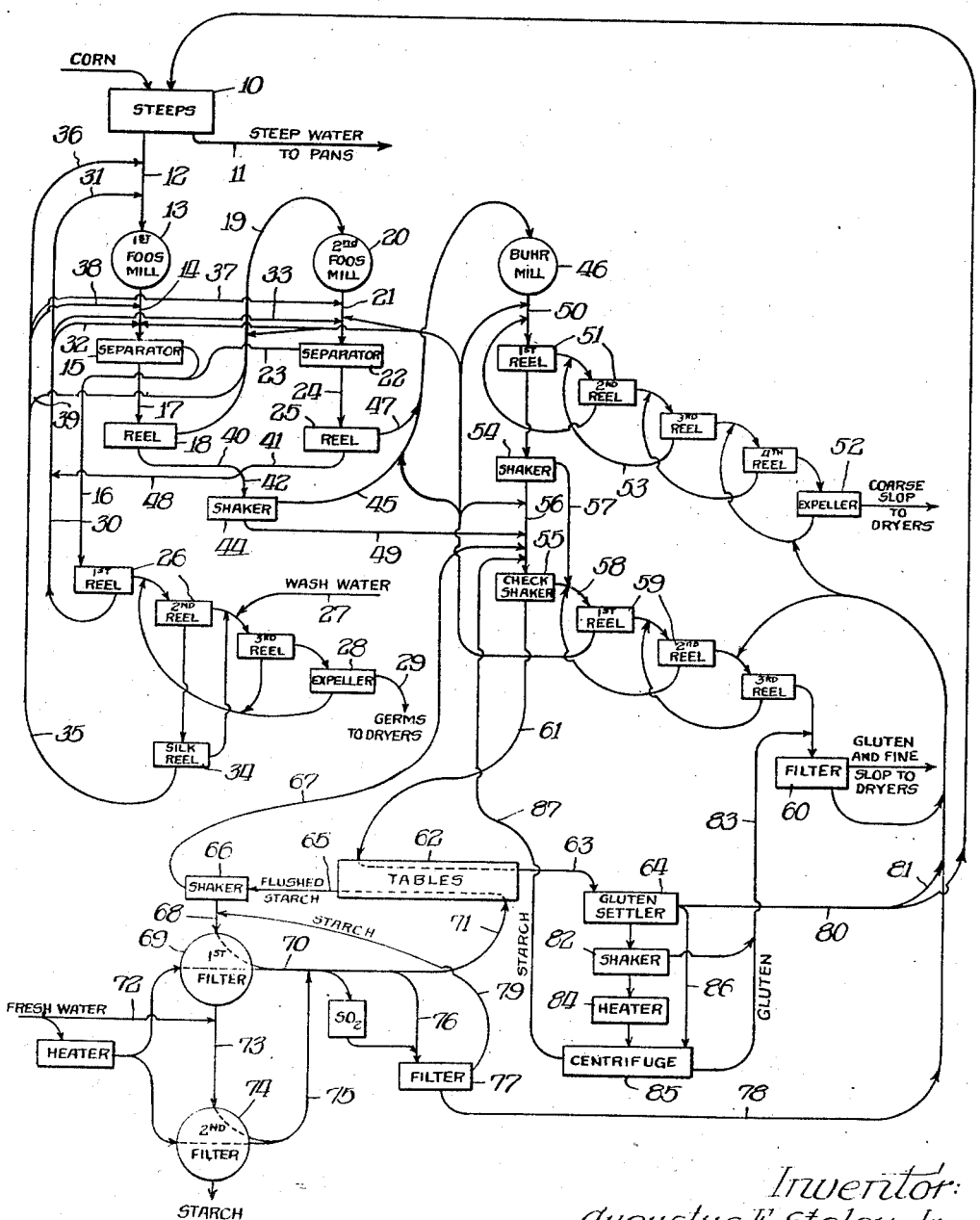
Inventor:
Augustus E. Staley Jr.
By Cromwell, Treist & Warden
attys.

Patented May 10, 1938

2,116,610

UNITED STATES PATENT OFFICE 2,116,610

STARCH MAKING PROCESS

Augustus E. Staley, Jr., Decatur, Ill., assignor to A. E. Staley Manufacturing Company, Decatur, Ill., a corporation of Delaware Application November 17, 1934, Serial No. 753,482

2 Claims. (Cl. 127—69)

The present invention pertains to the processing of corn, and has particular reference to improvements in the production of starch and other products from corn by the so called "wet milling" process in which corn is subjected to a series of operations designed to separate the various constituents of the corn.

The first step in the "wet milling" process is to steep the corn in water warmed to proper temperature and fortified with sulphur dioxide, this operation acting to soften the corn and to remove considerable quantities of solubles therefrom. After steeping, the corn is cracked and degerminated by starch-milk flotation. The degerminated corn is ground and the fibrous constituents thereof are separated by screening operations. The degermination and separation of the fibrous constituents result in the production of water suspensions of starch and gluten. Customarily, the starch and gluten are separated by taking advantage of the difference in the permanence of suspension of the two materials. One method of effecting the separation of the starch is to allow the suspension to travel down an extended table, the starch settling out on the table and the gluten passing over the end of the table in water suspension. The tabling operation, however, does not effect a complete separation of starch from the gluten, and ordinarily the gluten overflow will contain starch in amounts which may vary from 30 to 50 per cent.

A principal object of the present invention is to provide a process for effecting an efficient separation of starch by an economically feasible process.

An additional object is the provision of an improved starch-making process in which considerable quantities of the residual starch ordinarily lost by incorporation with the gluten are recovered.

A further object is to provide a starch-making process having a novel and effective combination of starch and gluten-separating steps.

These and other objects will be evident from a consideration of the following description of a preferred embodiment of the invention and by reference to the accompanying drawing, in which is represented a flow sheet embodying the invention.

It has been suggested heretofore to effect the separation of starch and gluten in a water suspension of the same by means of centrifugal action, and several patents have been issued on mechanisms for performing this function. For example, attention is called to Peltzer Patent No. 1,923,454, issued August 22, 1933 and Peltzer Patent No. 1,945,786, issued February 6, 1934. However, in such instances the machines in question were considered as substitutes for the well known tabling process. As centrifugal machines operate more rapidly than do the tables and occupy considerably less space, they have met with some favor. In accordance with the present invention I have found that unusually satisfactory results may be obtained from the standpoint of starch recovery by the combination of the centrifugal and tabling processes in a particular manner.

As shown in the accompanying flow sheet, the corn to be processed is placed in the customary progressive steeping device indicated by numeral 10, in which several batches of corn are soaked in a countercurrent manner in warm water fortified with sulphur dioxide, the corn being softened and having much of its solubles content removed. The steep water is withdrawn through line 11 and transferred to vacuum pans for concentration. The steeped corn is transferred through line 12 to a first Foos mill 13 where it is cracked for loosening of the corn germ. From the Foos mill the cracked corn is transferred through line 14 to a germ separator 15 in which the cracked corn is subjected to starch-milk flotation, the lighter germs floating to the top of the separator and being transferred through line 16 to a germ-washing system. The remaining constituents of the corn pass through line 17 into a reel 18 which removes the starch-milk. The corn then is transferred through line 19 to a second Foos mill 20 for further cracking, after which the materials are transferred through line 21 to a second germ flotation separator 22. The germs recovered in separator 22 are transferred through line 23 into the line 16 leading to the germ-washing reels. From the separator 22 the underflow containing the constituents of the corn other than starch-milk is passed through line 24 into a reel 25 for separation of starch-milk.

The germs from separators 15 and 22 are combined in line 16 and delivered to the first of a series of germ-washing reels 26, wherein the germs are progressively washed by a countercurrent of wash water introduced by line 27 from the starch-washing system to be described more particularly hereinafter. An expeller 28 removes excess wash water from the germs, the latter being sent to a drier through line 29.

The starch-milk passing through the first germ reel is received by line 30. Three branch lines 31, 32, and 33 lead from the line 30 respectively to line 12 above the first Foos mill, and germ flotation separators 15 and 22.

The starch-milk passing through the second germ reel 26 is passed through a silk reel 34 and into line 35. Line 35 is provided with four branch lines 36, 37, 38, and 39 leading respectively to line 12 above the first Foos mill, germ flotation separator 22, germ flotation separator 15, and line 19 leading to the second Foos mill.

The starch-milk separated from the degerminated corn in reels 18 and 25 is delivered through lines 40 and 41 to a common line 42 leading to a shaker 44 which separates residual quantities of fibrous constituents from the milk, such constituents being transferred into line 45 leading to a Buhr mill 46. Reel 25 acts to separate the major portion of the fibrous constituents or slop from the germ separator starch-milk and from this reel these degerminated constituents of the corn are transferred into line 47 leading to the Buhr mill.

It is desirable to return a portion of the heavy starch-milk from the germ separators back to the flotation operation, and for this purpose a stream may be taken from line 42 through line 48 and into line 30.

Starch-milk passing from shaker 44 is transferred through line 49 to the fine slop system to be described more particularly hereinafter.

From the reel 25 the degerminated corn is transferred through lines 47 and 45 to Buhr mill 46 in which the corn is finely ground. After the grinding step the corn is passed through line 50 to the first of a series of reels 51 operable to separate coarse fibrous constituents or slop from the ground corn by washing with a countercurrent of water. The coarse slop is freed from the major portion of the water with which it is incorporated after leaving the fourth reel by means of the expeller 52.

The countercurrent of wash water passing through the reels 51 produces a starch-milk which is introduced above the first reel through line 53 and passes therethrough to the shaker 54, the latter separating from the starch-milk particles of fibrous constituents of smaller size than the coarse slop. A check shaker 55 makes a further separation of the fine fibrous constituents or fine slop from the starch-milk which passes from shaker 54 through line 56. The fine slop from shaker 54 is transferred through line 57 into the slop line 58 from the check shaker 55, the combined fine slop then being passed through a system of fine slop wash reels 59 countercurrently against a stream of wash water. After passing from the reels 59 the fine slop is filtered in the filter 60 and sent to feed driers in the usual manner.

In the "wet-milling" operation described, three streams of starch-milk consisting of a starch-gluten mixture suspended in water are developed. One stream comes from the germ system, while each of the slop-washing systems contributes additional starch-milk. The three streams are combined in line 56 and pass through the check shaker into a line 61 leading to a starch-gluten separating system.

The starch-milk passing through check shaker 55 is free of fibrous constituents and passes through line 61 to a number of parallel tables 62 where the major portion of the starch is separated from the gluten in a manner well known heretofore. The starch tables are troughs of substantial length and as the starch-milk passes therethrough the major portion of the starch settles out. The gluten requires a considerably longer period of time for separation from the water suspension and the water-gluten mixture passes from the tables 62 through line 63 into a gluten settler 64.

The starch which settles on the tables 62 is flushed off with water through line 65 and the starch-water is passed through a shaker 66 for removal of large particles, these particles being returned through line 67 to the starch-milk flowing through line 56. From the shaker 66 the flushed starch passes through line 68 to a filter 69. The water used in flushing the starch is removed in this filter and is passed through line 70 and a portion is sent back to the tables through branch line 71. After removal of the water used in flushing the starch the latter is washed with fresh water introduced through line 72, the wash water also passing into line 70.

The washed starch from the first filter 69 is taken into suspension by additional fresh water and passed through line 73 to a second filter 74. The take-up water is passed from the second filter back to line 70 through line 75. Additional fresh water is used to wash the starch deposited on the second filter and this wash water also is transferred to line 70. Starch is removed from the second filter and dried in the usual manner.

Line 70, then, carries the various waters separated from the starch in the first and second filters and the waters employed in washing the starch to produce a finished product. Considerably more water is employed in the first and second filters than is needed for flushing the starch in the tabling operation, and the excess is taken from line 70 by means of line 76. After being passed through a filter 77 to remove residual quantities of starch this water is passed through line 78 to the coarse and fine slop-washing reels. Additional quantities of the water passing through line 78 may be directed into line 27 of the germ wash system. Therefore, it is seen that the starch wash water, which is low in solubles content, constitutes a part of the process water employed in the "wet milling" operation. The starch from filter 77 is returned to line 68 through line 79.

The gluten suspension passing from the tables 62 through line 63 ordinarily contains starch in quantities which may range from 30 per cent to 50 per cent or more, depending upon the effectiveness of the tabling operation. This mixture of gluten and residual starch is separated from the process water in settler 64 and the requisite portion of this process water is transferred through line 80 to the steeps 10, thereby forming a closed or bottled-up system. A portion of the gluten settler water may be transferred through a side line 81 to line 78 leading to the reels 51 and 59. The gluten settler sludge, containing a sufficient quantity of water to allow it to be handled properly, is passed over a shaker 82 to remove relatively large particles, the latter passing over the tail or end of the shaker into line 83. From the shaker 82 the gluten sludge is passed through a heater 84 in which the sludge is warmed slightly above normal room temperature and then into a continuous centrifugal separator 85 of the type referred to hereinbefore. A quantity of water necessary for effecting proper separation in the centrifuge 85 is transferred thereto from the gluten settler by means of a line 86. The particular structure and operation of the centrifuge is not of present interest, since it is satisfactorily described in the Peltzer patents to which reference has been made. The centrifuge, as its name indicates, acts on a somewhat different principle than the tables, the gluten and residual starch mixture being passed into the centrifuge in which a spinning operation effects a further separation of residual starch from the gluten. This residual starch is transferred through line 87 to the line 56 leading to check shaker 55. Eventually, the starch is recovered from the second filter 74.

The major portion of the starch in the original mill starch stream passing through line 61 may be removed by tabling, and in fact, further quantities of starch may be removed from the gluten tailings which pass to settler 64 by an additional tabling operation. However, the small quantity of residual starch mechanically incorporated with the gluten is so difficult of separation by tabling that second tables have not met with favor, and the residual starch customarily is lost from the starch yield. I have found that by employing a tabling operation on the original starch-gluten mixture in which a relatively large quantity of easily settled starch is present and a spinning operation or centrifugal separation on the starch-lean gluten residue, a particularly large total yield of merchantable starch is obtained at a cost which makes the operation commercially attractive. Additionally, a gluten is obtained having an appreciably higher nitrogen content.

Under normal circumstances, the combination of steps specified results in the reduction of the starch content of the gluten by approximately 50 per cent, and this starch is added to the total starch recovery, thereby materially increasing the efficiency of the manufacturing process.

Ordinarily the gravity of the starch stream issuing from the centrifuge is considerably higher than the gravity of the starch-milk developed in the "wet milling" operation, and admixture of the centrifuged starch with the mill starch may increase the gravity of the starch passing through line 61 to the tables. The tabling operation serves to substantially remove impurities such as gluten from the centrifuged starch, and as the quantity of such impurities in the centrifuged starch is quite small, the starch content of the stream passing to the tables is raised, thereby facilitating the tabling operation.

The gluten sludge passing from the gluten settler 64 after the dewatering operation is of somewhat different nature than the starch-gluten mixture passing through line 61 to the tables. In particular, the bulk of the gluten is in excess of the bulk of the residual starch, and the starch is more difficult of separation from the gluten than is the major portion of the starch deposited on the tables. Possibly the residual starch is more finely divided or mechanically bound to the gluten. Regardless of the correctness of such theories, I have found the centrifugal separation of particular utility in separating or stripping residual quantities of starch from the gluten sludge.

The invention has been described specifically for the purpose of explanation. It will be recognized that many changes in the process may be made without departing from the scope of the invention, and all such changes are intended to be included in the appended claims.

I claim:

1. In the manufacture of starch from corn, the steps including producing starch-milk containing a relatively large percentage of starch and gluten, tabling said starch-milk to remove the major quantity of starch therefrom, subjecting said gluten, containing residual quantities of starch, to a centrifugal operation for the separation of additional quantities of starch, and returning said additional starch to said starch-milk.

2. In the manufacture of starch from corn, the steps including treating the corn with water to produce starch-milk having a relatively large percentage of starch and gluten suspended therein, tabling said starch-milk to remove the major portion of the starch therefrom, removing substantial quantities of water from the resultant gluten tailings, employing said water to treat additional starch, subjecting said gluten tailings to a centrifugal operation for removing additional starch, and adding said additional starch to said starch-milk.

AUGUSTUS E. STALEY, Jr.